US010230670B1

(12) United States Patent
Cui et al.

(10) Patent No.: US 10,230,670 B1
(45) Date of Patent: Mar. 12, 2019

(54) WATERMARK-BASED MESSAGE QUEUE

(71) Applicant: Google LLC, Mountain View, CA (US)

(72) Inventors: Yi Cui, Palo Alto, CA (US); Subir Jhanb, Cupertino, CA (US); Thomas R. Kennedy, III, Alviso, CA (US)

(73) Assignee: Google LLC, Mountain View, CA (US)

( * ) Notice: Subject to any disclaimer, the term of this patent is extended or adjusted under 35 U.S.C. 154(b) by 466 days.

(21) Appl. No.: 14/537,075

(22) Filed: Nov. 10, 2014

(51) Int. Cl.
*H04L 12/58* (2006.01)

(52) U.S. Cl.
CPC ............ *H04L 51/046* (2013.01); *H04L 51/30* (2013.01)

(58) Field of Classification Search
None
See application file for complete search history.

(56) References Cited

U.S. PATENT DOCUMENTS

| | | | | |
|---|---|---|---|---|
| 5,551,034 A * | 8/1996 | Herz | ........................ | G05B 9/03 713/502 |
| 6,229,813 B1 | 5/2001 | Buchko | | |
| 7,415,470 B2 | 8/2008 | Kasamsetty | | |
| 8,572,185 B2 | 10/2013 | Williams | | |
| 8,762,328 B2 | 6/2014 | McCabe | | |
| 9,436,532 B1 * | 9/2016 | Chandrasekaran | ..... | G06F 9/546 |
| 2008/0244209 A1 * | 10/2008 | Seelam | ................... | G06F 3/061 711/168 |
| 2014/0059082 A1 | 2/2014 | Schreter | | |
| 2016/0044069 A1 * | 2/2016 | Thomas | ................ | H04L 49/552 709/228 |
| 2016/0149801 A1 * | 5/2016 | Morosan | ................ | H04L 45/22 370/228 |

FOREIGN PATENT DOCUMENTS

WO    1998/021654    5/1998

OTHER PUBLICATIONS

'Reliable Message Delivery', Sun Java System Message Queue 3 2005Q1 Technical Overview, 2005 [retrieved on Aug. 1, 2017]. Retrieved from the Internet: <URL:https://docs.oracle.com/cd/E19435-01/819-0069/msg_delivery.html>.*

(Continued)

*Primary Examiner* — Sm A Rahman
*Assistant Examiner* — Dae Kim
(74) *Attorney, Agent, or Firm* — Fish & Richardson P.C.

(57) ABSTRACT

Methods, systems, and apparatus, including computer programs encoded on computer storage media, for a watermark-based message queue. One of the methods includes receiving a first connection request for messages associated with a user device. A first connection session is established with the user device. A message queue of messages associated with the user device is identified, each message in the message queue is associated with a respective timestamp, and the message queue is associated with a current watermark that identifies a first timestamp. An oldest message in the message queue at the time the first connection session was established is identified. An updated watermark that identifies a second timestamp associated with the oldest message is associated with the message queue. One or more messages that have a timestamp newer than or equal to the first timestamp identified by the current watermark is provided to the user device.

20 Claims, 3 Drawing Sheets

(56) References Cited

OTHER PUBLICATIONS

"SlidingWindow," Cornell [online], Dec. 13, 1999 [retrieved on Jun. 10, 2015]. Retrieved from the Internet: URL<http://www.cs.cornell.edu/info/projects/javagroupsnew/userguide/html/user/node23.html>, 2 pages.

Wikipedia [online]. "Producer—Consumer problem," Jul. 2014 [retrieved on Jun. 10, 2015]. Retrieved from the Internet: URL<http://en.wikipedia.org/wiki/Producer%E2%80%93consumer_problem>, 7 pages.

\* cited by examiner

WATERMARK-BASED MESSAGE QUEUE

BACKGROUND

This specification relates to message queues.

User devices, e.g., mobile devices, can receive messages, e.g., text messages, e-mail messages, or other messages from other user devices or computer systems over a network, e.g., the Internet. The received messages can be stored by a server system and can be provided to a user device when the user device provides a request to receive messages. The server system can then provide stored messages for receipt by the user device.

SUMMARY

In general, one innovative aspect of the subject matter described in this specification can be embodied in methods that include the actions of receiving, from a user device, a first connection request for messages associated with the user device; establishing a first connection session with the user device; identifying a message queue of messages associated with the user device, wherein each message in the message queue is associated with a respective timestamp, and wherein the message queue is associated with a current watermark that identifies a first timestamp; identifying, from the timestamps associated with the messages in the queue, an oldest message in the message queue at the time the first connection session was established; associating with the message queue an updated watermark that identifies a second timestamp associated with the oldest message; and providing, to the user device, one or more messages that have a timestamp newer than or equal to the first timestamp identified by the current watermark in response to the first connection request during the first connection session.

The foregoing and other embodiments can each optionally include one or more of the following features, alone or in combination. The actions include receiving a second connection request for messages associated with the user device and establishing a second connection session with the user device; and providing each message that has a timestamp that is newer than the second timestamp identified by the updated watermark to the user device in response to the second connection request. The actions include receiving, from the user device, acknowledgement responses for at least one provided message; and providing a request to delete the at least one provided message from the message queue. The actions include determining that the first connection session has terminated; and storing data identifying one or more unacknowledged messages provided to the user device during the first connection session that did not receive acknowledgement responses. The actions include receiving a second connection request for messages associated with the user device and establishing a second connection session with the user device; and providing the unacknowledged messages. The actions include receiving a second connection request for messages associated with the user device and establishing a second connection session with the user device; receiving, from the user device, acknowledgement responses for at least one of the one or more unacknowledged messages; and providing a request to delete the unacknowledged messages that received acknowledgement responses from the message queue. The message queue comprises a plurality of message queues, and wherein providing one or more messages to the user device comprises: selecting a message from the plurality of message queues by performing a round robin process. Each of the message queues is specific to applications installed on the user device.

Particular embodiments of the subject matter described in this specification can be implemented so as to realize one or more of the following advantages. A system can efficiently identify messages stored in a message queue to be provided to a user device. The system can reduce the amount of time that memory devices require to seek messages, which reduces hard drive fatigue, power consumption, and allows for the system to service more user devices. Additionally, the system can ensure that all messages in the message queue are delivered to the user device, while retaining efficient identification and delivery of the messages.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for providing messages associated with a user device, e.g., a mobile device, a tablet, a wearable device, or other computing device, to the user device. In particular, a system can maintain a message queue of messages that are to be provided to the user device. The messages in the message queue can be text messages, e-mail messages, messages directed to applications (apps) installed on the user device, system messages, and so on.

The system can receive a connection request from the user device, e.g., over the Internet, establish a connection session with the user device, and provide messages in the message queue to the user device during the connection session. Each message in the message queue is associated with a timestamp, e.g., a timestamp identifying when the message was received by the system, and the messages in the message queue are ordered by their respective timestamps. The system also associates a watermark with the message queue. In this specification, a watermark is used to refer to data identifying a timestamp associated with an oldest remaining message in the message queue at the start of the previous connection session.

After establishing a connection session, the system scans the message queue from the timestamp identified by the watermark, and identifies an oldest message remaining in the message queue. The system then stores data identifying this timestamp and designates the data as an updated watermark to be used in a subsequent connection session.

After identifying an oldest message remaining in the message queue, the system provides the oldest message, and messages with newer timestamps, to the user device. The system will provide messages from the message queue until determining that the connection session has terminated, e.g., because the user device has been disconnected from the system. While the user device is connected to the system, the system receives acknowledgement responses from the user device confirming receipt of one or more of the provided messages by the user device. The system then deletes the one or more acknowledged messages from the message queue.

In general, the system may not be able to provide all messages from the message queue prior to a given connection session ending. For example, the user device may lose connectivity with the system before all of the messages can be provided because the user device has an unstable network connection or because a device battery has reached a point where network communication is no longer possible. Additionally, the system may not receive acknowledgement responses for each provided message before the network connection is terminated. Therefore, at some points in time, the message queue will store messages that have yet to be provided by the system to the user device and messages that were provided but were not acknowledged by the user device.

The system can then receive another connection request, e.g., subsequent to the connection request above, and provide messages remaining in the message queue in a subsequent connection session using the updated watermark determined above.

Figure 1:
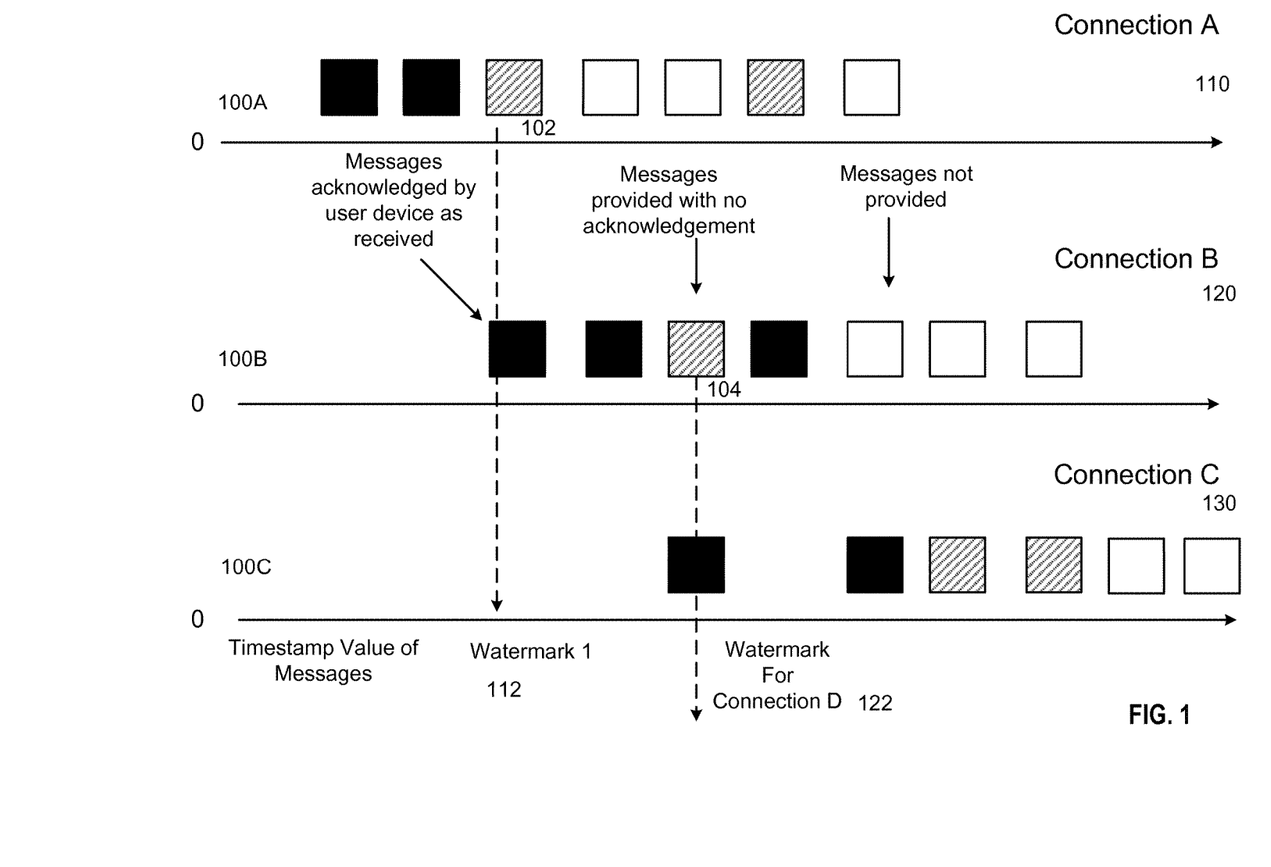
FIG. 1 illustrates a diagram of an example of providing messages from a message queue.

FIG. 1 illustrates an example of providing messages from a message queue maintained by a message system.

Three connection sessions, e.g., connection sessions A-C 110, 120, 130, are shown that illustrate the evolution of the message queue over time, e.g., the message queues 100A, 100B, 100C. Generally, a given connection session terminates when the user device submitting the request disconnects from the message system. The subsequent connection session begins when the user device re-connects to the message system and provides a new request for messages at a later time. As shown in the example of FIG. 1, in many cases the user device disconnects from the message system before all of the messages in the message queue can be provided to the user device.

The message queue corresponding to each connection session illustrates the state of the message queue at the time that the user device has disconnected from the message system to terminate the connection session. Message rectangles that are solid colored identify messages that the user device has acknowledged receipt of to the message system before disconnecting from the message system. Message rectangles that include diagonal lines identify messages that have been provided to the user device, but that have not been identified by the user device as having been received. Message rectangles that are empty identify messages that have not yet been provided to the user device.

The message queue 100A for connection session A 110 includes 7 ordered messages. When a connection request is received, the message system establishes a connection session with the user device and identifies messages in the message queue 100A to provide to the user device.

In general, the message system identifies messages in the message queue by scanning from a position in the message queue identified by a watermark, e.g., scanning forward in time. The identifier can be, for example, a timestamp of when a message was received by the message system in the message queue, an index value, and so on. A watermark is an identifier of a first, e.g., oldest, message remaining in the message queue at the start of a previous connection session. In the example of FIG. 1, connection session A 110 is the first connection session. Therefore, the message queue 100A does not have an associated watermark.

In response to establishing connection session A 110, the message system provides messages from the message queue 100A to the user device until the connection session ends, i.e., until the message system determines that the user device has disconnected. Since the message queue 100A does not have an associated watermark, the message system scans the message queue for messages from the start of the message queue. In the example of FIG. 1, during connection session A 110, the message system provided two messages that were acknowledged as received by the user device, two messages that were provided but not acknowledged, and was not able to provide the three remaining messages before the user device disconnected.

After the two messages have been acknowledged by the user device, the message system provides a request, e.g., to a storage system, to delete the two messages. These two messages are then removed from the message queue 100A, as illustrated in message queue 100B for connection session B 120.

Connection session B 120 is a subsequent connection session, e.g., the next session after connection session A 110, established with the user device to receive messages in the message queue 100B. Since no watermark was determined by the message system during connection session A 110, the message queue 100B still does not have an associated watermark. Therefore, the message system scans the message queue for messages from the start of the message queue 100B, as in connection session A 110.

The message system scans the message queue 100B until it identifies the first, e.g., oldest, message remaining in the message queue 100B, e.g., message 102. Message 102 was provided to the user device during the previous connection session, e.g., connection session A 110, but the user device did not acknowledge having received the message 102. Therefore, the message 102 was not deleted by the message system and remains in the message queue 100B.

The message system stores an identifier of the message 102, e.g., a timestamp associated with the message 102, and designates the identifier as the watermark 112 associated with the message queue 100B. As will be described below, the watermark 112 will be used in the subsequent connection session, e.g., connection session C 130.

The message system then provides messages from the message queue 100B to the user device until determining that the user device has disconnected from the message system. After the user device has disconnected and the connection session has terminated, the message system provides a request to delete three messages that were provided to the user device and were acknowledged as received by the user device. These three messages are then removed from the message queue 100B, as illustrated in message queue 100C for connection session C 130.

Connection session C 130 is a subsequent connection session, e.g., subsequent to connection session B 120, to receive messages in the message queue 100C. The message system obtains the associated watermark 112 and starts scanning the message queue 100C from the watermark 112. The message system then identifies the first, e.g., oldest, message remaining in the message queue 100C, e.g., message 104. The message system stores an identifier of the message 104, e.g., a timestamp associated with the message 104, and designates the identifier as the updated watermark 122 associated with the message queue 100C. This updated watermark 122 will be used in a subsequent connection request, e.g., in a connection session D.

As described above, the message system then provides messages from the message queue 100C to the user device until determining that the user device has disconnected from the message system.

Figure 2:
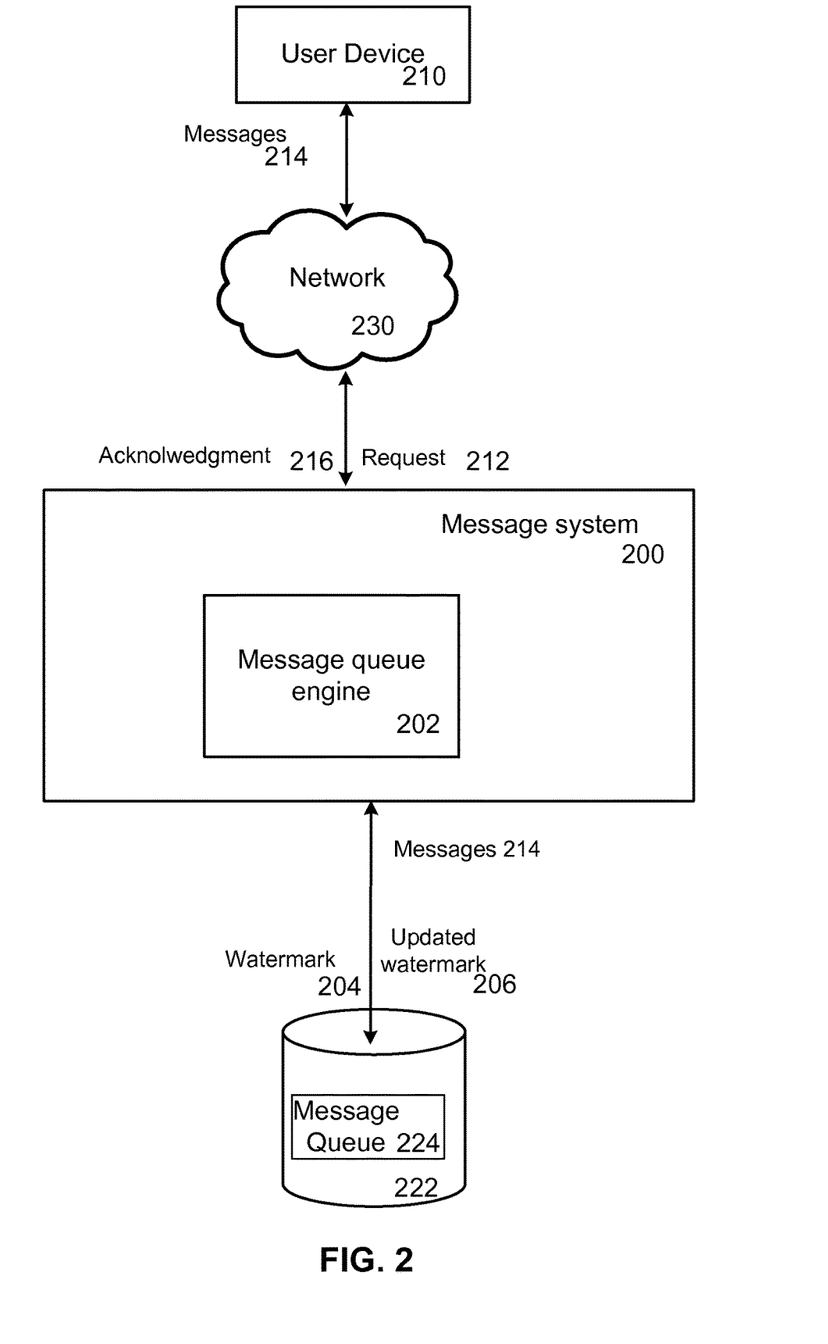
FIG. 2 illustrates an example system used for providing messages using a watermark-based message queue.

FIG. 2 shows an example message system 200. The message system 200 is an example of a system implemented as computer programs on one or more computers in one or more locations, in which the systems, components, and techniques described below are implemented.

The message system 200 can communicate with a storage system 222 that maintains a message queue 224 of messages stored by the storage system 222 that are intended for a user device 210. In some implementations, the storage system 222 is a replicated storage system. That is, in some implementations, the storage system 222 maintains multiple identical instances of the message queue 224, stores multiple identical instances of the messages in the message queue 224, or both, in multiple physical storage units located in multiple different physical locations.

The message queue 224 is associated with the user device 210. That is, the message queue 224 stores messages, e.g., text messages, e-mail messages, and other messages directed to applications installed on the user device 210, that are to be provided by the message system 200 to the user device 210. Each message in the message queue 224 can be associated with a timestamp, e.g., a time when the message system 200 received the message. In some implementations, the messages are ordered in the message queue 224 by respective timestamp.

The message system 200 includes a message queue engine 202 that receives a connection request 212 from the user device 210 over a network 230, e.g., a data network, e.g., the Internet, a cellular network, and so on. The connection request 212 identifies that the message system 200 is to provide messages 214 to the user device 210.

In response to the request 212, the message queue engine 202 establishes a connection session with the user device 210 and obtains a watermark associated with the message queue 224, e.g., a watermark 204 determined by the message system 200 during a preceding connection session with the user device 210. The watermark 204 identifies a timestamp of an oldest message remaining in the message queue 224 at the start of the preceding connection session. The message queue engine 202 scans the message queue from the timestamp identified by the watermark 204 and identifies an oldest message in the message queue 224. The message queue engine 202 then stores data identifying the timestamp associated with the oldest message and designates the data as an updated watermark 206 for use in a subsequent connection session with the user device 210.

In implementations where the storage system 222 is a replicated storage system, e.g., where the storage system 222 maintains multiple identical instances of the message queue 224 in different physical locations, the system can add a buffer, e.g., a specified amount of time, to the timestamp associated with the oldest message and designate the sum as the updated watermark 206. The buffer can be a fixed amount of time that can be selected to represent delay in propagating messages to each of the replicated storage systems, e.g., 30 seconds, 1 minute, 3 minutes.

Additionally, the storage system 222 can store information identifying a state of the message queue stored in each replicated storage system. The storage system 222 can receive updates from each replicated storage system, e.g., an update to the state, and store a timestamp of when each replicated storage system provided an update. The message queue engine 202 can designate the buffer value as the difference between the timestamp associated with the oldest message and the oldest timestamp of when a replicated storage system provided an update. The message queue engine 202 can then compute an addition of the buffer with the timestamp associated with the oldest message and store the sum as the timestamp identified by the updated watermark 206.

After determining the updated watermark 206, the message queue engine 202 provides messages 214 included in the message queue 224 to the user device 210. The user device 210 provides acknowledgments 216 for each message that is received by the user device 210 that identify the messages that have been successfully received by the user device 210. Once an acknowledgement for a message has been received, the message queue engine 202 provides a request to the storage system 222 to delete the acknowledged messages. In some implementations, the user device 210 can be associated with multiple users, e.g., user accounts associated with the user device 210. In these implementations, the message system 200 can maintain multiple message queues, e.g., a message queue for each user.

Figure 3:
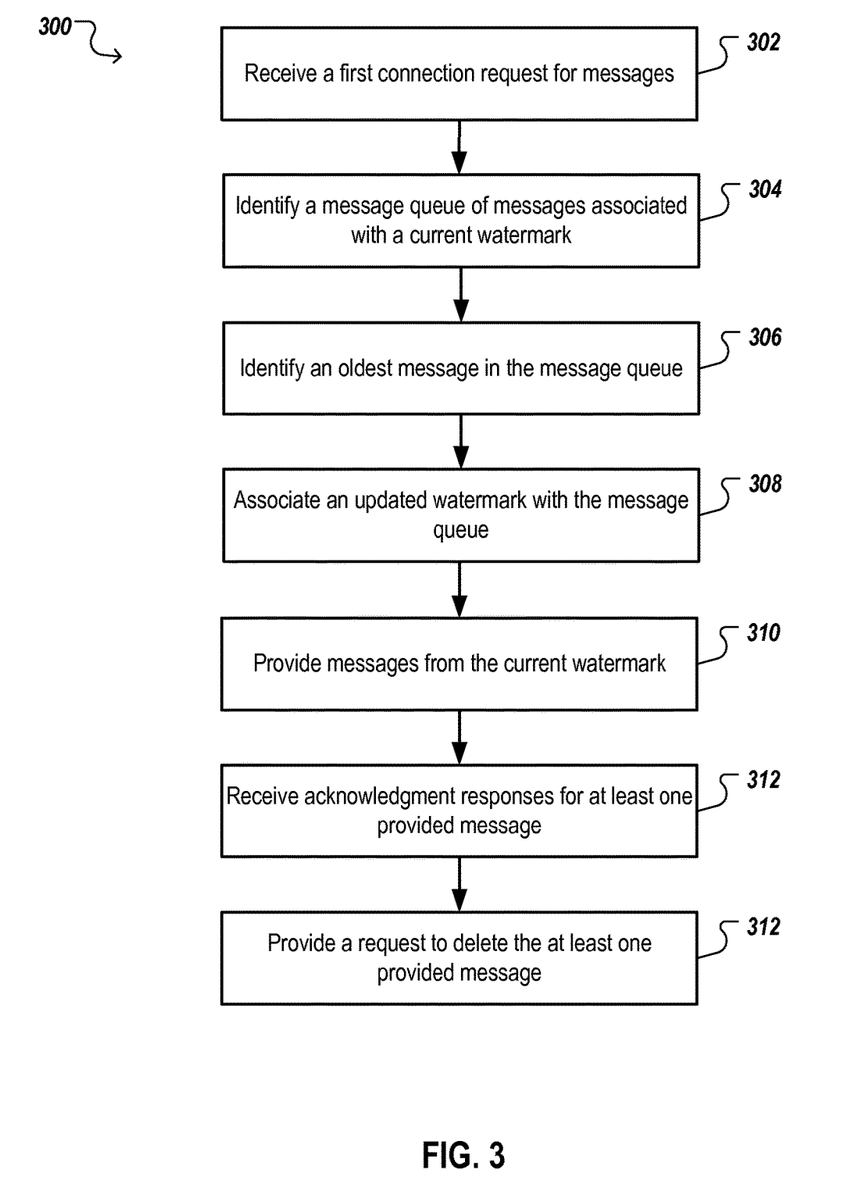
FIG. 3 illustrates a flowchart of an example process for providing messages using a watermark-based message queue.

FIG. 3 illustrates a flowchart of an example process 300 for providing messages using a watermark-based message queue. For convenience, the process 300 will be described as being performed by a system of one or more computers, e.g., the message system 200.

The system receives a connection request from a user device for messages (step 302). The system can receive the request when, for instance, the user device attempts to establish a connection with the system over a network, e.g., over a cellular network connection or over the Internet. After receiving the request, the system establishes a connection session with the user device.

The connection request can identify, for instance, a network address of the user device and a user device identifier and/or a user account of a user of the user device.

The system identifies a message queue of messages intended for the user device that is associated with a current watermark (step 304).

The message queue includes one or more messages that are to be provided to the user device. Each message in the message queue is associated with a timestamp, e.g., a value identifying a time that the system received the message. In some implementations, the messages are ordered in the message queue according to their respective timestamps. That is, the message queue can be indexed by timestamps, e.g., the system can maintain data that maps the timestamp associated with each message to an identifier for the message and order the identifiers by their associated timestamps.

The system additionally obtains a current watermark associated with the message queue that identifies a timestamp associated with an oldest message in the message queue at the start of the preceding connection session. Identifying the oldest message in the message queue at the start of a connection session is described below, with reference to step 306.

The system identifies an oldest message in the message queue (step 306). In order to identify the oldest message in the queue, the system scans the message queue for messages starting from the timestamp identified by the current watermark. The system scans forward in time through the message queue until it identifies a message that remains in the message queue, e.g., the oldest message that was not deleted after the preceding connection session.

The system designates the timestamp associated with the oldest message as an updated watermark and associates the updated watermark with the message queue in place of the current watermark (step 308). That is, the system stores the timestamp associated with the oldest message and associates the timestamp with the message queue as the updated watermark for the queue for use in responding to a subsequent connection request. As described above, in some cases, the system may use a buffer to modify the timestamp associated with the oldest message before designating it as the updated watermark.

The system provides messages to the user device (step 310). In particular, the system provides messages in the message queue that are newer than the current watermark obtained in step 304. In some implementations, the system stores information identifying the messages that are provided.

Since the current watermark obtained in step 304 identifies a timestamp associated with an oldest message remaining in the message queue, the system can provide messages out of order, e.g., without strict adherence to the order of timestamps associated with messages, while ensuring that all messages in the message queue are provided.

In some implementations, the message queue includes multiple separate message queues, e.g., one for each application executing on the user device, or a message queue that depends on a location of the computer system. In these implementations, the system obtains messages from each queue and provides them to the user device. In some implementations, the system can obtain the messages from the message queue by selecting from the multiple queues using a round robin technique, e.g., obtaining a message from a first message queue, then another message from a different message queue. In some other implementations, the system can obtain messages from each message queue in order of timestamp associated with the messages across all message queues.

The system receives acknowledgment responses from the user device for at least one provided message (step 312). The acknowledgments identify messages that were provided to the user device and that the user device has confirmed receiving.

The system provides a request to delete the acknowledged messages (step 312), e.g., to a storage system that stores the acknowledged messages.

The system provides messages as described above until the connection session terminates, i.e., until the system determines that the user device has disconnected from a network connection with the system. For instance, the user device can be connected to a cellular network and get disconnected. The system can identify that the user device has disconnected based on information identifying the connection session, e.g., an establishment link signal, or identifying that an amount of time that the user device has not provided information to the system has exceeded a threshold, e.g., a time-out.

In response to a subsequent request received from the user device, the system can establish a connection session and receive acknowledgement responses for messages that were provided in the connection session described above. The system can then provide a request to delete the messages. That is, when a subsequent connection request is received from the user device, the system can obtain information identifying messages provided to the user device, e.g., from stored information described above in step 310, that were not acknowledged by the user device as being received during the preceding connection session. The system can then provide a request to the user device to identify whether the user device received the messages, e.g., to guard against acknowledgment responses getting lost over the network. If the user device acknowledges receiving one or more of the messages, the system then provides a request to delete the messages identified by the user device as received without re-sending the messages to the user device during the current connection session.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
receiving, from a user device, a first connection request for messages associated with the user device;
identifying a message queue of messages associated with the user device, wherein each message in the message queue is associated with a respective timestamp;
establishing a first connection session with the user device, wherein the message queue at a beginning of the first connection session includes at least a first message identified as delivered to and acknowledged by a recipient, the first message associated with a first timestamp;
identifying a current watermark that is associated with i) the message queue and ii) the first connection session, the current watermark identifying a previous timestamp of an oldest message remaining in the message queue at a start of a previous connection session preceding the first connection request, the previous timestamp of the current watermark being earlier than the first timestamp of the first message that is identified as delivered to and acknowledged by the recipient;
providing, to the user device, one or more messages that have a timestamp newer than or equal to the previous timestamp identified by the current watermark in response to the first connection request during the first connection session;
updating the current watermark, including:

identifying an oldest message in the message queue starting from the previous timestamp, identifying a second timestamp associated with the oldest message in the message queue starting from the first timestamp identified by the current watermark, and associating with the message queue an updated watermark based on the second timestamp.

2. The method of claim 1, further comprising:

receiving a second connection request for messages associated with the user device and establishing a second connection session with the user device; and providing, to the user device, one or more messages that have a timestamp that is newer than or equal to the second timestamp identified by the updated watermark to the user device in response to the second connection request.

3. The method of claim 1, further comprising:

receiving, from the user device, acknowledgement responses for at least one provided message; and providing a request to delete the at least one provided message from the message queue.

4. The method of claim 1, further comprising:

determining that the first connection session has terminated; and storing data identifying one or more unacknowledged messages provided to the user device during the first connection session that did not receive acknowledgement responses.

5. The method of claim 4, further comprising:

receiving a second connection request for messages associated with the user device and establishing a second connection session with the user device; and providing, to the user device, the unacknowledged messages.

6. The method of claim 4, further comprising:

receiving a second connection request for messages associated with the user device and establishing a second connection session with the user device;

receiving, from the user device, acknowledgement responses for at least one of the one or more unacknowledged messages; and providing a request to delete the unacknowledged messages that received acknowledgement responses from the message queue.

7. The method of claim 1, wherein the message queue comprises a plurality of message queues, and wherein providing one or more messages to the user device comprises:

selecting a message from the plurality of message queues by performing a round robin process.

8. The method of claim 7, wherein each of the message queues is specific to applications installed on the user device.

9. The method of claim 1, wherein associating with the message queue the updated watermark based on the second timestamp further comprises:

computing an addition of the second timestamp and a buffer value; and designating the addition as the second timestamp identified by the updated watermark.

10. A system comprising:

one or more computers and one or more storage devices storing instructions that, when executed by the one or more computers, cause the one or more computers to perform operations comprising:

receiving, from a user device, a first connection request for messages associated with the user device;

identifying a message queue of messages associated with the user device, wherein each message in the message queue is associated with a respective timestamp;

establishing a first connection session with the user device, wherein the message queue at a beginning of the first connection session includes at least a first message identified as delivered to and acknowledged by a recipient, the first message associated with a first timestamp;

identifying a current watermark that is associated with i) the message queue and ii) the first connection session, the current watermark identifying a previous timestamp of an oldest message remaining in the message queue at a start of a previous connection session preceding the first connection request, the previous timestamp of the current watermark being earlier than the first timestamp of the first message that is identified as delivered to and acknowledged by the recipient;

providing, to the user device, one or more messages that have a timestamp newer than or equal to the previous timestamp identified by the current watermark in response to the first connection request during the first connection session;

updating the current watermark, including:

identifying an oldest message in the message queue starting from the previous timestamp, identifying a second timestamp associated with the oldest message in the message queue starting from the first timestamp identified by the current watermark, and associating with the message queue an updated watermark based on the second timestamp.

11. The system of claim 10, wherein the operations further comprise:

receiving a second connection request for messages associated with the user device and establishing a second connection session with the user device; and providing, to the user device, one or more messages that have a timestamp that is newer than or equal to the second timestamp identified by the updated watermark to the user device in response to the second connection request.

12. The system of claim 10, wherein the operations further comprise:

receiving, from the user device, acknowledgement responses for at least one provided message; and providing a request to delete the at least one provided message from the message queue.

13. The system of claim 10, wherein the operations further comprise:

determining that the first connection session has terminated; and storing data identifying one or more unacknowledged messages provided to the user device during the first connection session that did not receive acknowledgement responses.

14. The system of claim 13, wherein the operations further comprise:

receiving a second connection request for messages associated with the user device and establishing a second connection session with the user device; and providing, to the user device, the unacknowledged messages.

15. The system of claim 10, wherein the message queue comprises a plurality of message queues, and wherein providing one or more messages to the user device comprises:
selecting a message from the plurality of message queues by performing a round robin process.

16. A computer program product, encoded on one or more non-transitory computer storage media, comprising instructions that when executed by one or more computers cause the one or more computers to perform operations comprising:
receiving, from a user device, a first connection request for messages associated with the user device;
identifying a message queue of messages associated with the user device, wherein each message in the message queue is associated with a respective timestamp;
establishing a first connection session with the user device, wherein the message queue at a beginning of the first connection session includes at least a first message identified as delivered to and acknowledged by a recipient, the first message associated with a first timestamp;
identifying a current watermark that is associated with i) the message queue and ii) the first connection session, the current watermark identifying a previous timestamp of an oldest message remaining in the message queue at a start of a previous connection session preceding the first connection request, the previous timestamp of the current watermark being earlier than the first timestamp of the first message that is identified as delivered to and acknowledged by the recipient;
providing, to the user device, one or more messages that have a timestamp newer than or equal to the previous timestamp identified by the current watermark in response to the first connection request during the first connection session;
updating the current watermark, including:
identifying an oldest message in the message queue starting from the previous timestamp,
identifying a second timestamp associated with the oldest message in the message queue starting from the first timestamp identified by the current watermark, and
associating with the message queue an updated watermark based on the second timestamp.

17. The computer program product of claim 16, wherein the operations further comprise:
receiving a second connection request for messages associated with the user device and establishing a second connection session with the user device; and
providing, to the user device, one or more messages that have a timestamp that is newer than or equal to the second timestamp identified by the updated watermark to the user device in response to the second connection request.

18. The computer program product of claim 16, wherein the operations further comprise:
receiving, from the user device, acknowledgement responses for at least one provided message; and
providing a request to delete the at least one provided message from the message queue.

19. The computer program product of claim 16, wherein the operations further comprise:
determining that the first connection session has terminated; and
storing data identifying one or more unacknowledged messages provided to the user device during the first connection session that did not receive acknowledgement responses.

20. The computer program product of claim 19, wherein the operations further comprise:
receiving a second connection request for messages associated with the user device and establishing a second connection session with the user device; and
providing, to the user device, the unacknowledged messages.

* * * * *

UNITED STATES PATENT AND TRADEMARK OFFICE
CERTIFICATE OF CORRECTION

PATENT NO. : 10,230,670 B1
APPLICATION NO. : 14/537075
DATED : March 12, 2019
INVENTOR(S) : Cui et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 540 days.

Signed and Sealed this
Tenth Day of December, 2019

Andrei Iancu
*Director of the United States Patent and Trademark Office*